United States Patent Office 3,042,238
Patented July 3, 1962

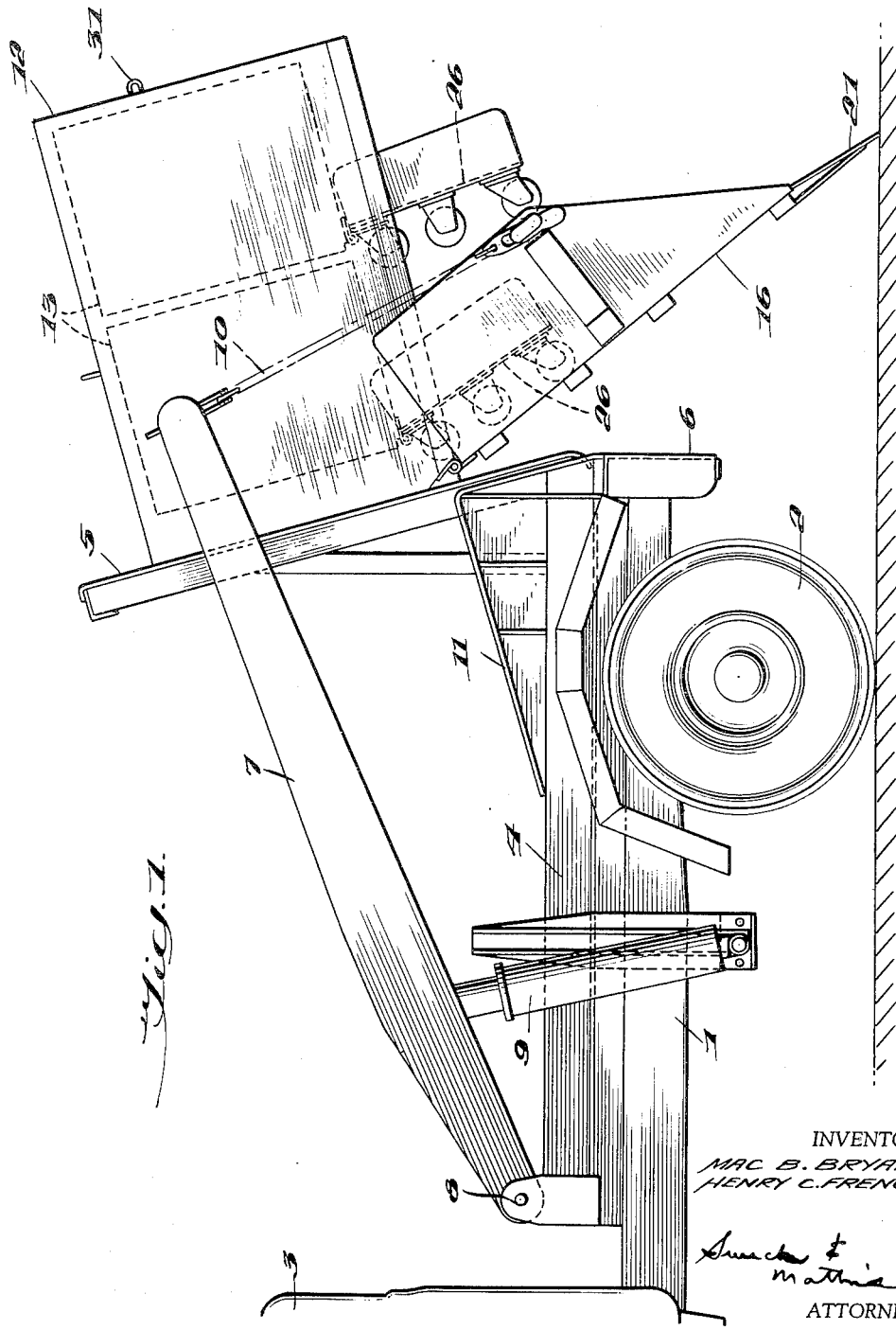

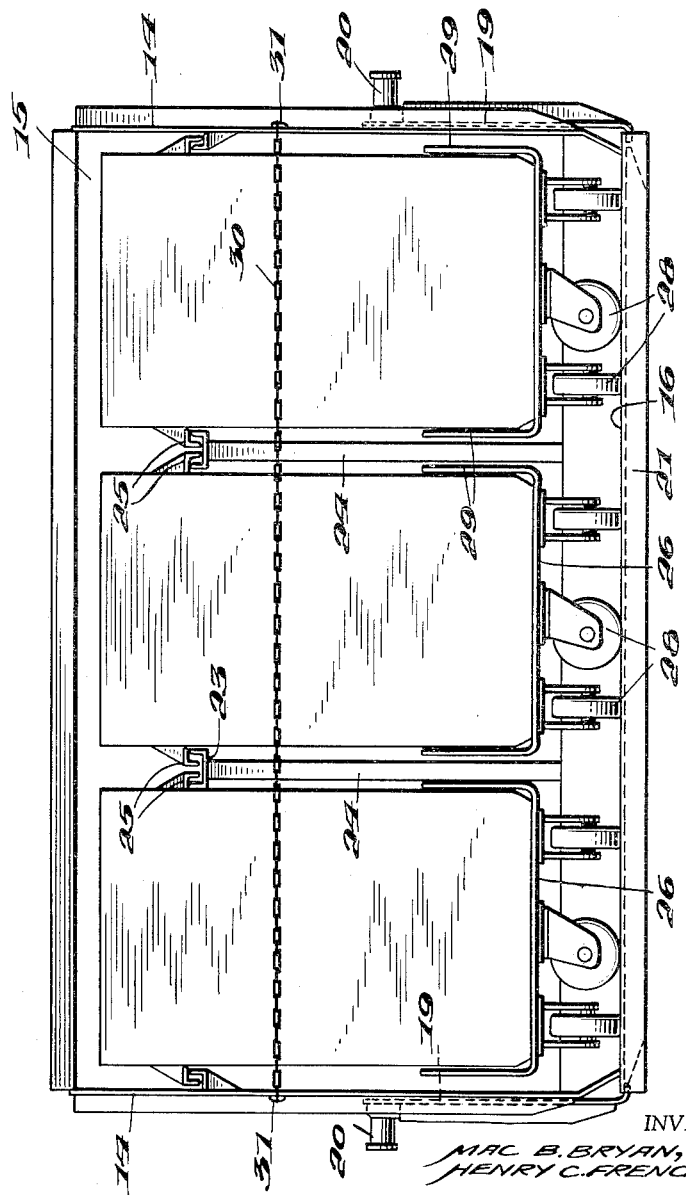

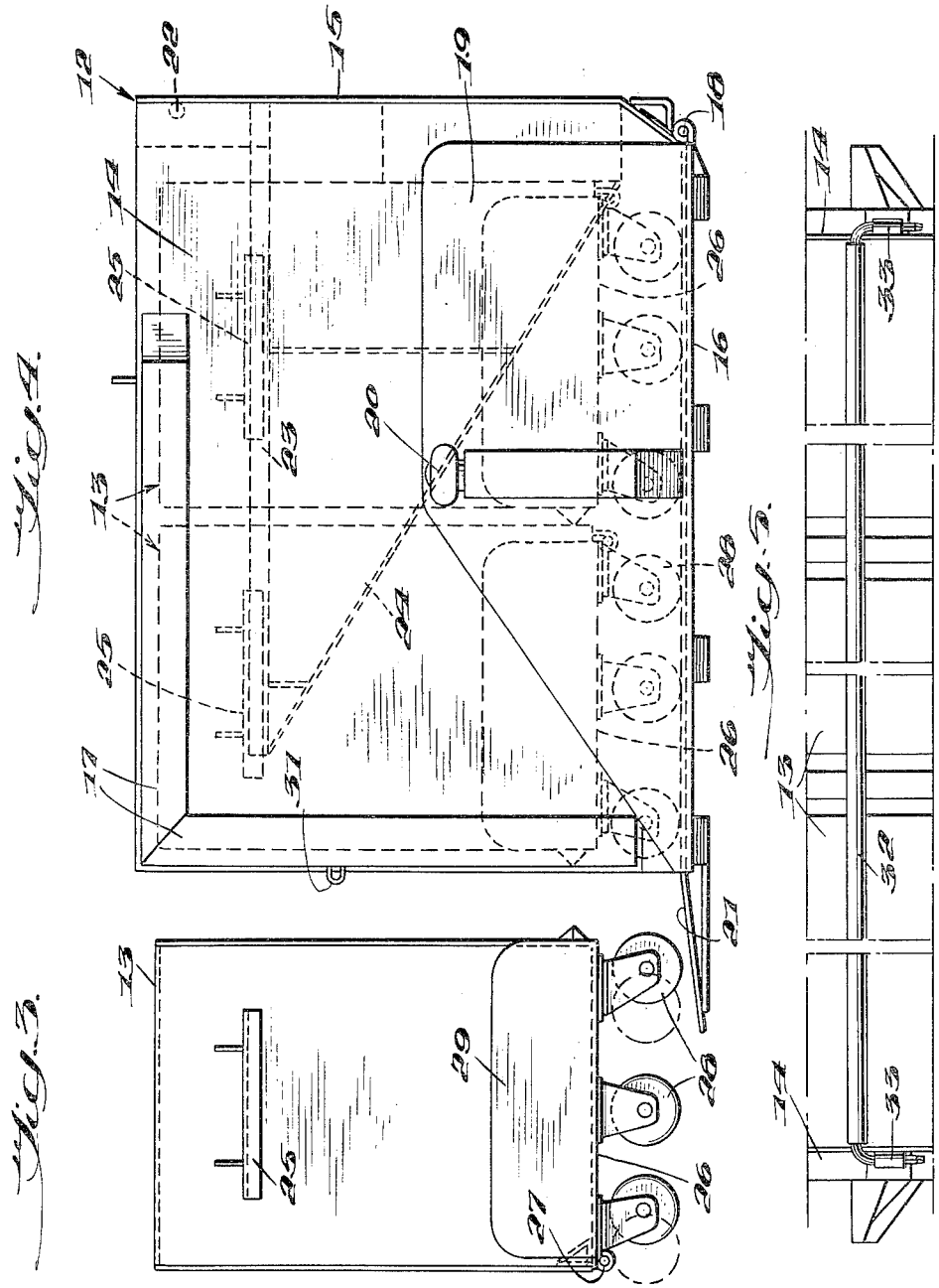

3,042,238
CONTAINERS FOR TRANSPORTING AND
DUMPING MATERIALS
Mac B. Bryan, Lake Charles, La., and Henry C. French, Knoxville, Tenn., assignors to Dempster Brothers, Inc., Knoxville, Tenn., a corporation of Tennessee
Filed Aug. 3, 1959, Ser. No. 831,351
6 Claims. (Cl. 214—317)

This invention relates to improvements in containers for transporting and dumping materials, such as refuse.

In the use of material transporting and dumping equipment of the character set forth, for example, in the Dempster patent, No. 2,281,183, April 28, 1942, it has been the customary practice heretofore to use a single container which is elevated from the ground to a transport position on the vehicle, carried thereby to the point of dumping, where it contents are discharged, after which this single container is returned to the point of filling.

Occasions arise when it is desirable to transport and dump small loads considerably less than the capacity of containers of the size usually employed with such vehicles. In such cases, it is wasteful and uneconomical to make a plurality of trips to the point of dumping with a vehicle handling a single small container. Moreover, it is often desirable to collect the refuse at one or more points, which are remote from, and even inaccessible to, the transporting vehicle, as, for example, within a building or other structure which is connected to the exterior thereof through narrow passageways. In such instances, the material to be transported would need to be carried to the container loading point externally of the building by separate transport means, and there dumped into the large container.

Attempts have been made heretofore to provide a multiple container assembly wherein the individual containers can be loaded and then collected in a unit or carrying case, where these can be transported collectively to a remote point for dumping. An example of such an assembly is set forth in the Jones patent, No. 2,606,675, August 12, 1952.

Such a multiple container assembly, as used heretofore, is subject to several objections. The size of the individual containers has precluded the use thereof in close aisles, small elevators and other narrow passages, as often encountered. The dumping of the collective containers through the side or top thereof has limited the maximum dump angle approximately to 40°. There are times when light trash, rubbish and paper will not dump at this angle, and such materials often require a dumping angle of approximately 55°.

One object of this invention is to overcome these objections, while providing a multiple container assembly which may be handled readily and dumped effectively in material transporting and dumping equipment of the character for which this container assembly is adapted.

Another object of the invention is to provide a multiple container assembly in which the insert individual containers may be made square and of lighter weight, to facilitate better handling characteristics due to its physical size and shape.

Still another object of the invention is to provide for greater capacity with limited overall size.

These objects may be accomplished, according to one embodiment of the invention, by providing a container assembly including a master carrying case having a plurality of insert containers removably mounted therein for individual filling separate and apart from the carrying case and for assembly and support therein during transportation and during dumping. Provision is made for secure and effective holding of the insert containers in place in the carrying case.

The dumping action is provided by a discharge door on the bottom of the carrying case and separate discharge doors on the bottoms of the respective insert containers, such that these will open automatically upon opening movement of the discharge door on the case, thereby automatically directing the contents from the container assembly. With such an arrangement, it is not necessary to turn the insert containers over partially or entirely during the dumping action, but the required dumping angle is obtained by the opening movement of the discharge doors. Moreover, this permits the insert containers to be fitted into the master carrying case, one behind another, without limitation as to the dumping action thereof.

This embodiment of the invention is set forth in the accompanying drawings, in which:

FIG. 1 is a side elevation of transporting equipment, showing the container assembly applied thereto and in dumping position;

FIG. 2 is a rear elevation of the container assembly;

FIG. 3 is an end elevation of one of the insert containers;

FIG. 4 is an end elevation of the container assembly, with the parts in loaded positions; and FIG. 5 is a side elevation, showing a modification.

The invention is shown as applied to a transport and dumping vehicle of the character which may be used for handling a multiple container assembly. An example thereof is set forth in the aforesaid Dempster patent, No. 2,281,183. As shown in FIG. 1, the vehicle chassis 1 includes ground engaging wheels 2 and is adapted to be self-propelled with a portion of the vehicle cab shown at 3 in which the operator normally is stationed.

Supported on the chassis 1 is a subframe assembly 4 within which is mounted a carriage that is movable forward and backward relative to the vehicle and has an upright skid frame 5 in position to form an upright continuation of a rear apron 6 mounted on the chassis 1 for receiving and guiding the container assembly in the raising and lowering movements and providing an upright skidway therefor.

The container assembly is adapted to be raised and lowered by a boom, generally indicated at 7, pivotally supported at 8 at the front end portion of the subframe 4 and operated by one or more hydraulic cylinders 9 which are also supported by the subframe 4. This type of hoisting unit is described merely as an example of the unit on which the container assembly may be used.

The container assembly is adapted to be raised and lowered by a pair of flexible devices 10, such as lifting chains. These lifting chains 10 extend downward from the free ends of the boom 7 to lifting pins on the container assembly, as hereinafter described.

After raising of the container by the boom 7 and lifting chains 10, substantially to the height illustrated in full lines in FIG. 1, the container assembly can be moved forward on the carriage which supports the skid frame 5, and the container assembly may be set down on a container rest, indicated generally at 11, on the subframe 4. The container assembly is carried in this position, supported on the rest 11 during transportation, to the point of dumping, after which it may be picked up and moved to the rear of the vehicle, as illustrated in FIG. 1, when the dumping action is accomplished.

The container assembly comprises a master carrying case 12 having means therein for receiving and holding a plurality of insert containers 13. These insert containers may be assembled, either in a single row or in multiple rows, as desired, according to the relative size and dimensions of the respective parts. In the example illustrated in the drawing, two rows of insert containers are shown, which are carried in the master carrying case. As shown in FIGS. 1, 2 and 4, the master carrying case 12 comprises a pair of opposite end walls 14, a front wall 15 and a bottom discharge door 16. The case is open at the rear and at the top, in this example, for freedom of access to the insert containers that are disposed therein. Suitable reinforcing means is provided for stiffening and reinforcing the parts of the container, such, for example, as reinforcing channels 17 on the end walls and along the open rear side thereof.

The bottom door 16 is hinged at 18 to the lower edge of the front wall 15, so as to open downwardly relatively thereto. This door 16 is also provided with wing plates 19 in positions to overlap and embrace the opposite end walls 14 of the case and to effect discharge of the contents therefrom upon opening of the door 16, as will be apparent from FIG. 1. Lifting pins are shown at 20 connected with the respective wing plates 19 and in positions to receive the lifting chains 10 to support the container assembly thereby and to hold the door 16 in its open position. This discharge door 16 may be provided, if desired, with a ramp 21 on the free edge thereof opposite from the hinge 18, to facilitate movement of the insert containers into and out of the carrying case.

As set forth in the aforesaid Dempster patent, No. 2,281,183, the hoisting unit shown in FIG. 1 is usually provided with a dumping hook on the skid frame 5 in position for engagement with a bail on the body of the container assembly to hold the latter in place during dumping action. This bail is indicated generally at 22 in FIG. 4 and is provided in the front wall 15 of the carrying case adapted to be engaged by the automatic hook on the hoisting unit.

Extending transversely of the length of the carrying case 12 from the front wall 15 toward the open rear thereof, are one or more tracks 23 held in elevated positions by partition plates 24 which extend upright along the front wall 15 and have their lower edges oblique, projecting downwardly from the front ends of the tracks 23. The tracks 23 serve to guide the insert containers in the carrying case 12.

Each of the insert containers 13 is provided with downturned angles 25 on opposite ends thereof in positions for guiding relation with the tracks 23, as will be apparent from FIGS. 2 and 4.

Each insert container 13 has surrounding side walls and may have an open or closed top, as desired. The bottom of the insert container 13 is indicated at 26 and is in the form of a door, hinged at 27 to the body of the insert container 13, for downward opening movement relative thereto, as will be apparent from FIG. 1. Supporting rollers are shown at 28, some or all of which may be swivelled, if desired, for rolling action of the insert container into and out of the case 12. Skids or other means of support may be provided in place of the rollers, if desired. Each discharge door 26 may be provided with upturned side wings 29 overlapping the opposite sides of the insert container 13, to facilitate discharge of the material.

Two rows of insert containers are illustrated in FIGS. 1 and 4, wherein the containers are disposed one behind another, as in columns and each pair of containers is guided at opposite sides by tracks 23 on the partitions 24 and on the inner faces of the end walls 14 of the case, so as to hold the insert containers in abutting relation to each other and properly spaced apart lengthwise of the case. All of these containers may be held in the case in any suitable manner, as by means of a chain, shown at 30 (FIG. 2), extending transversely between fastening eyes 31 on the respective opposite end walls 14 of the case, or by a bar 32 (FIG. 5) extending between the end walls 14 and having downturned ends engaging in sockets 33 on said end walls. The bar 32 not only holds the insert containers in place, but it also holds the width of the master container, anchoring the end walls thereof.

The insert containers can be assembled as illustrated, while the container assembly is hauled to the point of dumping in the manner described above. There the container is dumped, as shown in FIG. 1, by holding the body of the case 12 on the automatic hook and bail 22 while lowering of the boom 7 on the lifting chains 10 lowers the door 16. This, in turn, lowers the doors 26 on the insert containers, opening the latter automatically for discharging the contents from the insert containers over the door of the case and discharging effectively all of the insert containers. The doors 26 of the insert containers, not being held closed except by gravity, fall open freely as soon as the door 16 of the case is opened, since the body portions of the insert containers are suspended in the case 12 of the tracks 23.

Then, upon closing of the main door 16 of the case, the doors 26 of the insert containers are automatically closed. This supports the container assembly and enables it to be set down again on the rest 11 for transporting it back to the point of filling.

When that point is reached, the several individual insert containers can be removed individually from the case 12 and moved away to the respective points of filling. The case, in turn, may be used for picking up and dumping another series of insert containers in the manner described.

While the invention has been illustrated and described in one embodiment, it is recognized that variations and changes may be made therein without departing from the invention as set forth in the claims.

We claim:

1. A container of the character described, comprising a master carrying case including a body portion and a bottom discharge door hinged to the body portion for downward swinging movement relative thereto, a plurality of insert containers aligned in rows and columns with at least two insert containers in each row and each column within the carrying case and seated upon the bottom door thereof, each of the insert containers including a body portion and a bottom discharge door hinged to the body portion for downward opening movement relative thereto upon opening movement of the first-mentioned bottom discharge door, bracket means on the body portion of each insert container adjacent the top thereof and means inside and rigid with the body portion of the carrying case adjacent the top thereof cooperating with the bracket means for supporting the body portions of the insert containers within the carrying case during the opening movements of the doors to prevent the insert containers from falling downwardly out of the carrying case.

2. A container of the character described, comprising a master carrying case including a body portion and a bottom discharge door hinged to the body portion for downward swinging movement relative thereto, a plurality of insert containers within the carrying case and seated upon the bottom door thereof, each of the insert containers including a body portion and a bottom discharge door hinged to the body portion for downward opening movement relative thereto upon opeing movement of the first-mentioned bottom discharge door, means forming spaced tracks in the body portion of the carrying case adjacent the upper portions thereof, and support members on the body portions of the insert containers in positions to seat on the tracks and support the body portions thereon during opening movements of the doors.

3. A container of the character described, comprising a master carrying case including a body portion and a bottom discharge door hinged to the body portion for downward swinging movement relative thereto, a plurality of insert containers within the carrying case and seated upon the bottom door thereof, each of the insert containers including a body portion and a bottom discharge door hinged to the body portion for downward opening movement relative thereto upon opening movement of the first-mentioned bottom discharge door, said carrying case body portion having one or more transverse partitions therein supported by the body portion with tracks on the upper edges of said partitions, and shoes on opposite sides of each insert container in position to seat upon the tracks and support the body portion of the insert container thereon during opening movements of the doors.

4. A container of the character described, comprising a master carrying case including parallel end walls, a front wall, and a bottom discharge door hinged to the front wall for downward opening movements relative thereto, said carrying case having a series of partitions therein parallel to the end walls, and a plurality of insert containers removably supported within the carrying case, each of the insert containers having a bottom discharge door in position for downward opening movement upon opening movement of the carrying case door, one or more of said insert containers being located between said partitions, said insert containers normally supported by the carrying case door but adapted to be supported by the partitions during opening movement of the carrying case door.

5. A container of the character described, comprising a master carrying case including parallel end walls, a front wall, and a bottom discharge door hinged to the front wall for downward opening movement relative thereto, said carrying case having a series of partitions therein parallel to the end walls, track means on top of said partitions, and a plurality of insert containers removably supported within the carrying case, each of the insert containers having a bottom discharge door in position for downward opening movement upon opening movement of the carrying case door, shoes on opposite sides of said insert containers, said track means and said shoes cooperating to position one or more insert containers between said partitions, said insert containers normally supported by the carrying case door but said shoes being adapted to cooperate with said track means to support the insert containers on the partitions during opening movement of the carrying case door.

6. Material handling apparatus of the character described for use with a vehicle, a master carrying case including parallel end walls, a front wall, and a bottom discharge door hinged to the front wall for downward opening movement relative thereto, said carrying case having a series of partitions therein parallel to the end walls, a plurality of insert containers removably supported within the carrying case, each of the insert containers having a bottom discharge door, one or more of said insert containers being located between said partitions, said insert containers normally supported by the carrying case door, means on the vehicle for hoisting the carrying case and insert containers onto the vehicle, and means for allowing the carrying case door to move downwardly and for allowing the insert container doors to move downwardly whereupon the insert containers are supported within the carrying case by the partitions.

References Cited in the file of this patent

UNITED STATES PATENTS

| | | |
|---|---|---|
| 1,557,659 | Coleman | Oct. 20, 1925 |
| 2,606,675 | Jones | Aug. 12, 1952 |
| 2,626,069 | Jones | Jan. 20, 1953 |

FOREIGN PATENTS

| | | |
|---|---|---|
| 500,852 | Belgium | Feb. 15, 1951 |